(12) United States Patent
Vasagar (10) Patent No.: US 8,205,891 B2
(45) Date of Patent: Jun. 26, 2012

(54) INTERSHAFT SEAL ASSEMBLY

(75) Inventor: Thurai Manik Vasagar, Hatfield, PA (US)

(73) Assignee: Stein Seal Company, Kulpsville, PA (US)

( * ) Notice: Subject to any disclaimer, the term of this patent is extended or adjusted under 35 U.S.C. 154(b) by 849 days.

(21) Appl. No.: 12/210,246

(22) Filed: Sep. 15, 2008

(65) Prior Publication Data

US 2010/0066027 A1    Mar. 18, 2010

(51) Int. Cl.
*F16J 15/02* (2006.01)

(52) U.S. Cl. .................................... 277/585; 277/579

(58) Field of Classification Search .................. 277/305, 277/422, 579, 585, 580, 581
See application file for complete search history.

(56) References Cited

U.S. PATENT DOCUMENTS

| | | | |
|---|---|---|---|
| 3,124,502 A * | 3/1964 | Radke | 428/66.4 |
| 4,405,134 A | 9/1983 | Sargent et al. | |
| 4,426,087 A | 1/1984 | Sargent et al. | |
| 4,750,746 A * | 6/1988 | Boudot et al. | 277/578 |
| 4,752,077 A * | 6/1988 | Hoffelner | 277/367 |
| 4,754,984 A | 7/1988 | Keba | |
| 5,239,750 A | 8/1993 | Wright | |
| 6,036,191 A * | 3/2000 | Millard | 277/553 |
| 6,196,790 B1 | 3/2001 | Sheridan et al. | |
| 6,378,873 B1 * | 4/2002 | Mayer et al. | 277/355 |
| 6,887,038 B2 | 5/2005 | Cabe et al. | |
| 7,055,826 B2 * | 6/2006 | Stewart, Jr. | 277/358 |
| 7,291,947 B2 * | 11/2007 | Hashiba et al. | 310/54 |
| 7,549,834 B2 | 6/2009 | Kirchhof et al. | |
| 2007/0085278 A1 | 4/2007 | Davis et al. | |
| 2008/0252019 A1 * | 10/2008 | Yu | 277/434 |

FOREIGN PATENT DOCUMENTS

| | | |
|---|---|---|
| EP | 93300281.8 A1 | 9/1993 |
| EP | 02022640.3 B1 | 3/2006 |
| EP | 05107296.5 B1 | 3/2008 |
| JP | 05-038024 | 2/1994 |
| JP | 2001-311312 | 4/2003 |
| JP | 2004-233338 | 2/2006 |
| KR | 10-2007-0059569 | 12/2007 |

OTHER PUBLICATIONS

Eliseo Dirusso, Design Analysis of a Self-Acting Spiral Groove Ring Seal for Counter-Rotating Shafts, NASA Technical Paper 2142, May 1983.

* cited by examiner

*Primary Examiner* — Gilbert Lee
(74) *Attorney, Agent, or Firm* — Michael Crilly, Esq.

(57) ABSTRACT

An intershaft seal assembly for counter-rotating and co-rotating turbine engines is described. The seal assembly includes a pair of end rings and a seal element. At least one end ring has a flange, with upper and lower surfaces, disposed along and extending from one side of the ring. The seal element includes a ring, with inner and outer radial surfaces, and a ring flange wider than the ring. The ring flange is disposed along and extends diametrically from the outer radial surface, the latter also contacting the lower surface along at least one flange. The seal element is disposed between the end rings so that the ring flange extends beyond the flanges. The invention avoids the wear and heating problems inherent to intershaft seal systems, thus allowing the seal element to be composed of a temperature resistant metal, metal alloy, or carbon graphite.

29 Claims, 12 Drawing Sheets

INTERSHAFT SEAL ASSEMBLY

CROSS REFERENCE TO RELATED APPLICATIONS

None.

FEDERALLY SPONSORED RESEARCH AND DEVELOPMENT

None.

BACKGROUND OF THE INVENTION

1. Field of the Invention

The invention generally relates to a seal assembly for turbine engines. Specifically, the invention is an intershaft seal capable of providing a seal between inner and outer shafts rotatable about a common axis.

2. Background

Figure 1A:
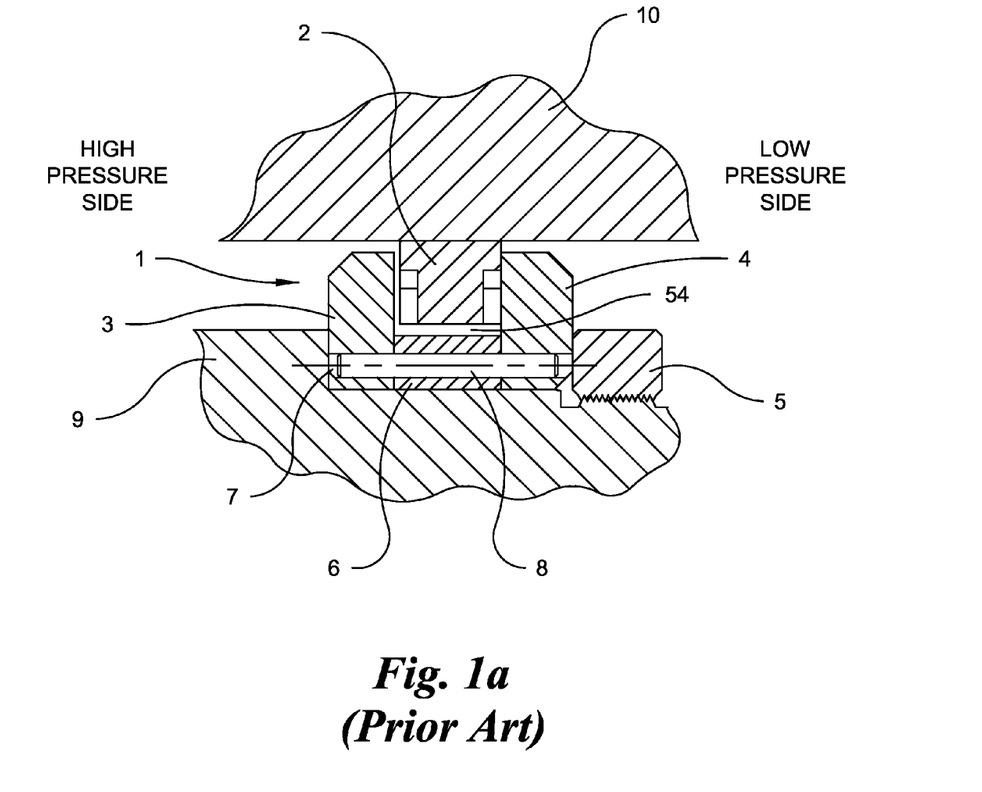
FIG. 1a is a cross sectional view of a prior art seal assembly disposed between a pair of rotating shafts.
Figure 1B:
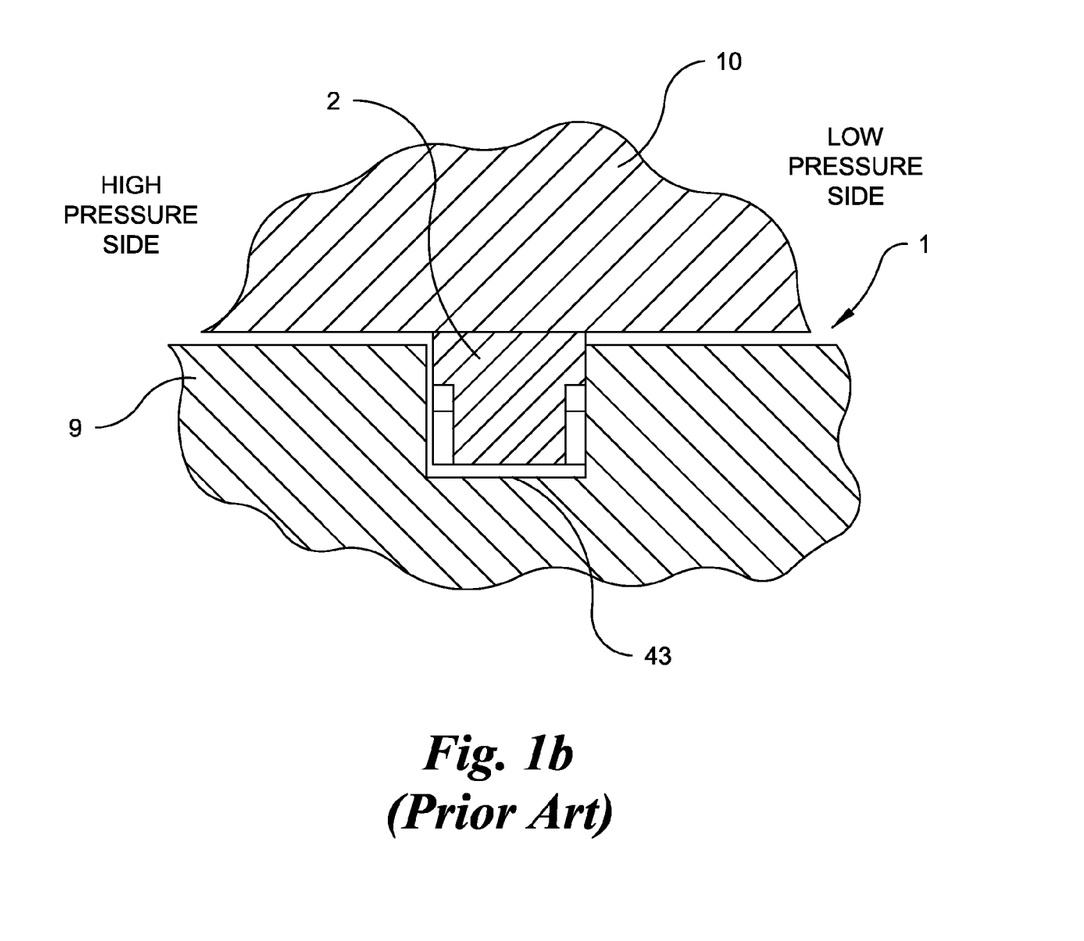
FIG. 1b is a cross sectional view of a prior art seal element disposed within a gland between a pair of rotating shafts.

Intershaft ring seals are designed to operate between co-rotating or counter-rotating shafts. A ring seal is typically composed of a carbon graphite material and resides within a generally square-shaped or rectangular-shaped channel, often referred to as a gland, formed between end rings or disposed within an inner shaft. When a ring seal is installed within an intershaft system, the seal exerts a small force onto the inner diameter of the outer shaft. During operation, a properly designed ring seal locks onto the outer shaft and spins within the channel or gland. Radial loads along the ring seal are influenced by the pressure between the shafts and centrifugal forces acting on the seal. Axial loads along the ring seal are influenced by the pressure component. Ring seals are designed to have adequate radial loading to prevent the axial load from pushing the seal onto the low pressure end of the channel. FIGS. 1a and 1b describe two intershaft seals from the prior art. It is understood that the left hand side of the seal assembly is the high pressure side and the seal rings are seated on the low pressure side of the end ring or the gland groove.

In FIG. 1a, an intershaft seal assembly 1 is shown including a ring-shaped seal element 2 and spacer ring 6 disposed between a pair of end rings 3, 4. Seal element 2, spacer ring 6, and end rings 3, 4 are further disposed between an outer shaft 10 and an inner shaft 9. End rings 3, 4 have a generally rectangular-shaped cross section and are secured to the inner shaft 9 via a locking ring 5 threaded onto the inner shaft 9 or other means understood in the art. The seal element 2 contacts the outer shaft 10. A gap 54 is disposed between the seal element 2 and the spacer ring 6. The radial height of the gap 54 is sized to avoid contact between the inner diameter of the seal element 2 and the outer diameter of the spacer ring 6 during radial excursions or run-out of the inner shaft 9 and outer shaft 10. In some embodiments, the spacer ring 6 is secured to the end rings 3, 4 via one or more roll pins 8, each disposed within a pin cavity 7 which traverses the spacer ring 6 and end rings 3, 4.

In FIG. 1b, another intershaft seal assembly 1 is shown including a seal element 2 disposed within a ring-shaped gland 43 along an inner shaft 9. The seal element 2 contacts the outer shaft 10 so as to form a seal between the inner diameter of the outer shaft 10 and outer diameter of the seal element 2. The gland 43 could be machined into the inner shaft 9. The axial length of the gland 43 and width of the seal element 2 are tightly controlled to achieve a very tight axial clearance between the seal element 2 and gland 43 so as to minimize leakage of gas from the system.

In both systems described above, the seal element 2 is further forced into the outer shaft 10 by the centrifugal force and pressure loading conditions so as to rotate with the outer shaft 10. In the first system, end rings 3, 4 rotate with the inner shaft 9 and limit axial translation of the seal element 2 along the inner shaft 9. In the second system, the walls of the gland 43 limit axial translation of the seal element 2.

Forces act on the seal element 2 from all sides. On the low pressure side, a pressure drop occurs from high to low pressure from the inner diameter to outer diameter of the seal element 2. The centrifugal loading on the seal element 2 together with radial pressure loads produces a force at the interface between the seal element 2 and outer shaft 10. Axial translation of the seal element 2 is resisted by the friction between the seal element 2 and outer shaft 10. For the seal element 2 to be in equilibrium, the difference in axial forces acting on the seal element 2 must equal the friction force that opposes translation. The relative motion between the seal element 2 and end rings 3, 4 or gland 43 is the sum of the inner and outer shaft speeds in counter-rotating applications and the difference of the inner and outer shaft speeds in co-rotating applications.

The coefficient of friction or pressure ratio greatly influences the performance of an intershaft seal assembly 1. If the coefficient of friction is not properly designed, the pneumatic force acting on the seal element 2 in the axial direction could overcome the opposing frictional force. Accordingly, the coefficient of friction should be kept below the implied coefficient of friction to avoid interactions between the seal element 2 and end rings 3, 4 or walls of the gland 43. Otherwise, the pressure force will push the seal element 2 against the end rings 3, 4 or gland 43 causing the seal element 2 to wear and overheat.

Wear and heating along the seal element 2 are minimized by planar contact surfaces between the seal element 2 and end rings 3, 4 or gland 43; however, wear and heating remains a significant challenge for most intershaft systems. Fluid films are sometimes used between a seal element 2 and end rings 3, 4 or gland 43 to reduce wear via the introduction of hydrodynamic bearing structures such as Rayleigh pads or spiral grooves along the faces of the seal element 2 or end rings 3, 4; however, such films do not have sufficient strength to overcome loading conditions typically encountered within intershaft seal systems. Furthermore, applications including fluid films must properly balance the leakage of gas within and from the seal system to avoid overheating conditions.

A typical seal element 2 will wear during its break-in period as it contacts the end rings 3, 4 or gland 43. This break-in period is completed when the axial clearance between the seal element 2 and end rings 3, 4 or gland 43 is equal to the combined axial run out of the end rings 3, 4 or gland 43. After the break-in period, the wear rate sharply decreases. However, wear remains a substantial challenge when the relative axial translation between inner shaft 9 and outer shaft 10 is greater than the break-in wear clearance, causing the end rings 3, 4 or gland 43 to "bump" the seal element 2 resulting in one revolution of wear for each axial translation.

As is readily apparent from the discussions above, the related arts do not include an intershaft seal capable of minimizing wear and heating during use.

Accordingly, what is required is a seal system capable of avoiding the wear and temperature problems associated with currently available intershaft seal systems.

SUMMARY OF THE INVENTION

An object of the invention is to provide a seal system capable of avoiding the wear and temperature problems associated with currently available intershaft seal systems.

In accordance with embodiments of the invention, the intershaft seal assembly includes a pair of end rings and a seal element. At least one end ring has a flange, with upper and lower surfaces, disposed along and extending from one side of the ring. The seal element includes a ring, with inner and outer radial surfaces, and a ring flange, whereby the ring is wider than the ring flange. The ring flange is disposed along and extends from the outer radial surface which also contacts the lower surface along at least one flange. The seal element is disposed between the end rings so that the ring flange extends beyond the flanges. Inner and outer shafts could be either counter-rotating or co-rotating about a common axis-of-rotation.

In accordance with preferred embodiments of the invention, the seal element has either a generally inverted T-shaped cross section or a generally L-shaped cross section and at least one end ring has a generally L-shaped cross section.

In accordance with yet other embodiments of the invention, the ring flange does not contact the outer shaft and could have a contoured surface adjacent to the outer shaft.

In accordance with further embodiments of the invention, the seal element and at least one end ring do not rotate separately.

In accordance with still other embodiments of the invention, the assembly further includes a gap disposed between the end rings, seal element, and inner shaft, a spacer bounded by the end rings, gap, and inner shaft, and a locking nut which secures one end ring to the inner shaft.

In accordance with still yet other embodiments of the invention, the spacer ring is secured to at least one end ring or the seal element is movable between the end rings.

In accordance with still further embodiments of the invention, the seal element is composed of a temperature resistant metal, metal alloy, or carbon graphite, and the seal element has a joint which traverses the seal.

In accordance with still other embodiments, a spring is disposed within and contacts a groove along the seal element so as to impart an outward radial force onto the seal element when the inner shaft is stationary or rotating.

In accordance with still further yet other embodiments, each seal unit, inner shaft, and outer shaft have substantially similar thermal expansion properties to avoid contact between each seal element and outer shaft.

Several advantages are offered by the invention. The invention avoids the wear caused by the relative axial movement between the seal element and end ring faces. The invention avoids wear along the outer diameter of the seal ring caused by translations between the inner and outer shafts. The invention avoids friction induced heating along the seal element, via a substantially non-wearable sealing system, allowing the seal element to be composed of a metal, metal alloy, or carbon graphite, thereby reducing the cost of the seal system.

| REFERENCE NUMERALS | |
| --- | --- |
| 1 | Seal assembly |
| 2 | Seal element |
| 3 | End ring |
| 4 | End ring |
| 5 | Locking ring |
| 6 | Spacer ring |
| 7 | Pin cavity |
| 8 | Roll pin |
| 9 | Inner shaft |
| 10 | Outer shaft |
| 11 | Seal assembly |
| 12 | Seal element |

| -continued | |
| --- | --- |
| REFERENCE NUMERALS | |
| 13 | End ring |
| 14 | End ring |
| 15 | Locking ring |
| 16 | Spacer ring |
| 17 | Gap |
| 18 | Flange |
| 19 | Inner shaft |
| 20 | Outer shaft |
| 21 | Flange |
| 22 | Gap |
| 23 | Centerline |
| 24 | Ring |
| 25 | Ring flange |
| 26 | Inner surface |
| 27 | First outer surface |
| 28 | Second outer surface |
| 29 | Lower surface |
| 30 | Lower surface |
| 31 | Gap |
| 32 | Cavity |
| 33 | Cavity |
| 34 | Anti-rotation pin |
| 35 | Roll pin |
| 36 | End ring |
| 37 | Relief |
| 38 | Seal element |
| 39 | Upper surface |
| 40 | Clearance |
| 41 | Joint |
| 42 | Inner surface |
| 43 | Gland |
| 44 | Gap |
| 45 | Upper surface |
| 46 | Upper surface |
| 47 | Mechanical stop |
| 48 | Spring |
| 49 | Groove |
| 50a, 50b | Step |
| 51a, 51b | Step |
| 52 | Inner diameter |
| 53 | Intermediate ring |
| 54 | Gap |

BRIEF DESCRIPTION OF THE DRAWINGS

The invention will now be described in more detail, by way of example only, with reference to the accompanying drawings, in which.

DETAILED DESCRIPTION OF THE INVENTION

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale. The terms inner, outer, lower, upper, vertical, and horizontal are for descriptive purposes and are not intended to limit the intended scope of the invention and its various embodiments.

Figure 2:
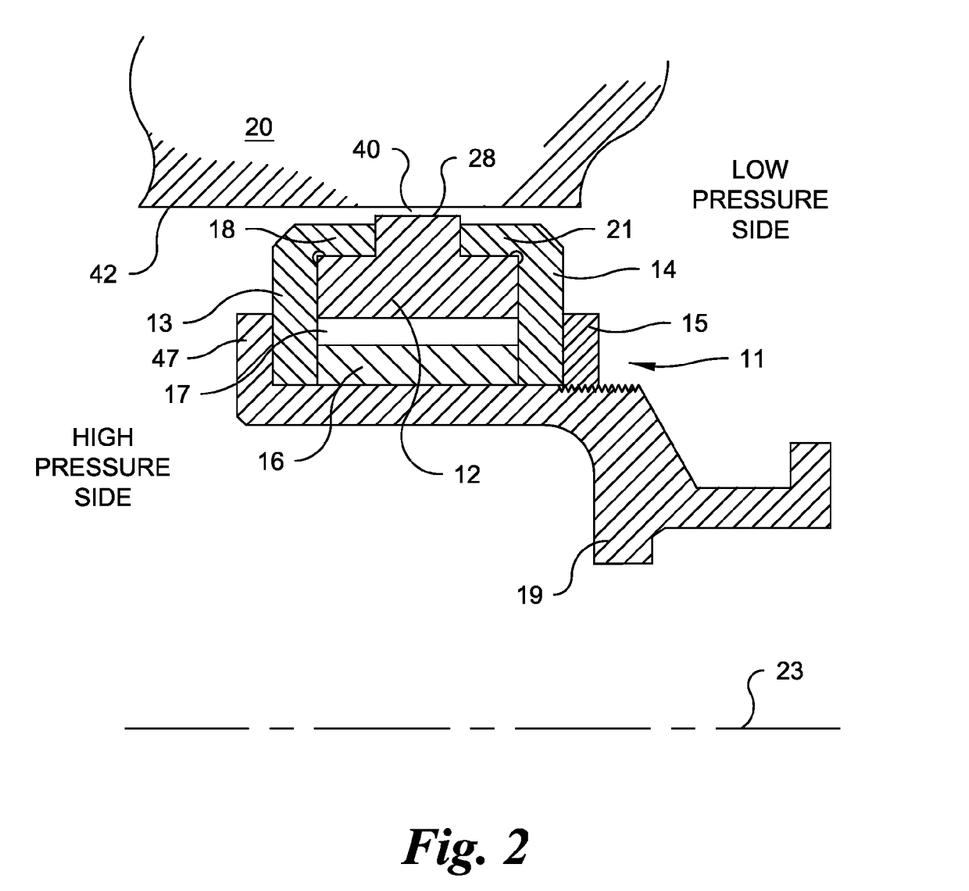
FIG. 2 is a cross sectional view illustrating a seal assembly with an inverted and generally T-shaped seal element disposed between a pair of rotating shafts in accordance with an embodiment of the invention.

Referring now to FIG. 2, the seal assembly 11 is shown including a pair of end rings 13, 14, a seal element 12, an optional gap 17, an optional spacer ring 16, and an optional locking ring 15 disposed between an inner shaft 19 and an outer shaft 20. Elements are disposed about a common centerline 23 or axis-of-rotation. A clearance 40 is provided between the inner surface 42 along the outer shaft 20 and a second outer surface 28 along the seal element 12. The height of the clearance 40 should be sufficient to avoid contact between the outer shaft 20 and seal element 12 and to minimize gas leakage across the seal element 12. Inner shaft 19 and outer shaft 20 are structures understood in the art which rotate in either a counter-rotational or co-rotational fashion.

Each end ring 13 and 14 includes a flange 18 and 21, respectively, so as to have a substantially L-shaped cross section. End rings 13, 14 are disposed in a substantially symmetrical arrangement about the seal element 12 and contact the inner shaft 19 so that the flanges 18, 21 are arranged immediately adjacent to but do not contact the outer shaft 20. This arrangement forms a structure having a generally inverted T-shaped cross section which complements the cross sectional design of the seal element 12.

The seal assembly 11 is designed so as to rotate with the inner shaft 19. One end ring 13 could be secured to the inner shaft 19 via a mechanical stop 47 and the other end ring 14 could be secured via a locking ring 15 threaded, pinned, other otherwise fastened or secured onto the inner shaft 19. It is likewise possible for both end rings 13, 14 to be secured to the inner shaft 19 via a pair of locking rings 15 separately disposed at the ends of the seal assembly 11. It is further possible for one end ring 13 or 14 to be an integral or unitary part of the inner shaft 19. Also, the seal assembly 11 could include a variety of stacking arrangements including additional spacers or the like which contact or are immediately adjacent to the locking ring 15.

The seal element 12 is disposed between and could contacts the end rings 13, 14. A spacer ring 16 having an overall diameter less than the seal element 12 also resides between the end rings 13, 14. In preferred embodiments, the outer diameter of the spacer ring 16 is less than the inner diameter of the seal element 12 so as to provide a gap 17 between the elements. The radial height of the gap 17 is preferred to be dimensioned so as to avoid contact between the inner diameter of the seal element 12 and the outer diameter of the spacer ring 16 during excursions of the inner and outer shafts 19, 20. Seal element 12 and/or spacer ring 16 could contact both end rings 13, 14.

Figure 12:
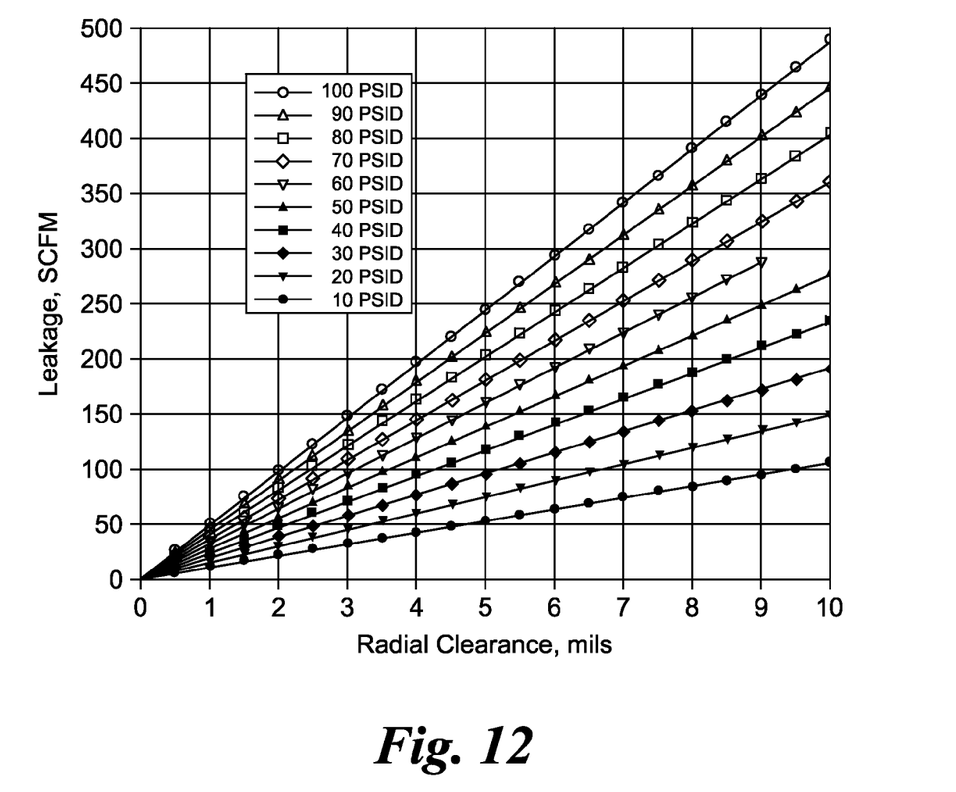
FIG. 12 is an exemplary plot showing leakage versus radial clearance in accordance with an embodiment of the invention.

The seal assembly 11 avoids the problems of temperature and load capacity associated with many fluid-film seals. The seal element 12 is a piston ring with a gap and a cross-sectional profile with an inverted T-shape. The seal element 12 has an interior flange that mates with the end rings 13, 14 attached to the inner shaft 19. Centrifugal force drives the seal element 12 against the overhang of the end rings 13, 14 and causes the seal element 12 to rotate with the inner shaft 19. Leakage occurs across a controlled clearance at the outer diameter of the seal element 12. FIG. 12 shows the leakage as a function of radial clearance and differential pressure for an exemplary system.

The advantage of the invention is its simplicity and avoidance of fluid-film problems. Since there is no relative movement between the seal element 12 and mating components, the seal element 12 minimizes wear. Materials comprising the end rings 13, 14, spacer ring 16, inner shaft 19, and outer shaft 20 are selected to have substantially similar thermal expansion properties to ensure the clearance 40 between the outer diameter of the seal element 12 and the inner diameter of the outer shaft 20 is closely controlled. The clearance 40 could dynamically vary because of the relative movement between the inner and outer shafts 19, 20.

Figure 3:
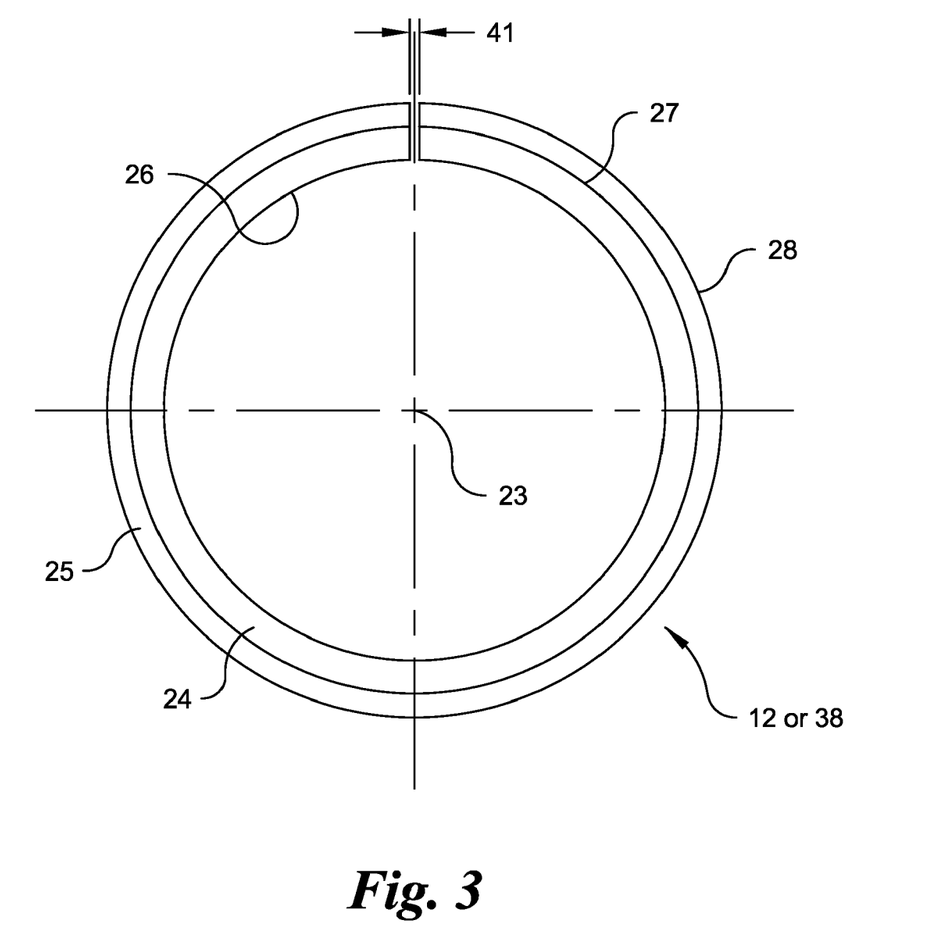
FIG. 3 is a side elevation view illustrating a seal element in accordance with an embodiment of the invention.

Referring now to FIG. 3, the seal element 12, 38 is comprised of a ring 24 and a ring flange 25 disposed about a common centerline 23. The ring 24 is a substantially circular element of uniform thickness with a generally square or rectangular cross section between an inner surface 26 and a first outer surface 27. The ring flange 25 is a substantially circular structure which extends from the first outer surface 27 along the ring 24. The ring flange 25 could have a substantially square or rectangular cross section. The cross sectional width of the ring flange 25 is less than the corresponding dimension along the ring 24, as represented in FIGS. 4 and 5.

Figure 4:
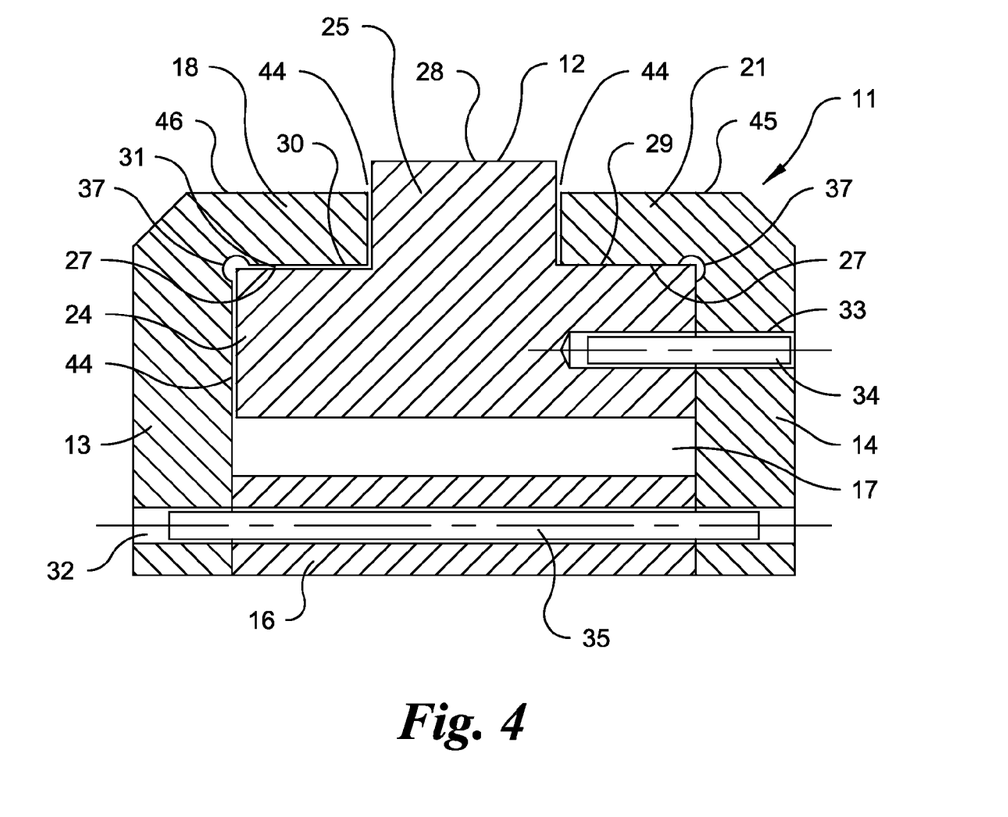
FIG. 4 is an enlarged cross sectional view illustrating a seal assembly with an inverted generally T-shaped seal element in accordance with an embodiment of the invention.

In some embodiments, the ring flange 25 is located along the ring 24 in a symmetric or non-symmetric arrangement to form a substantially inverted T-shaped cross section, as represented in FIG. 4. The stepwise cross section of the T-shaped seal element 12 provides a single second outer surface 28, corresponding to the outer diameter of the ring flange 25, disposed between a pair of first outer surfaces 27, corresponding to the interface between the outer diameter of the ring 24 and inner diameter of the ring flange 25.

Figure 5:
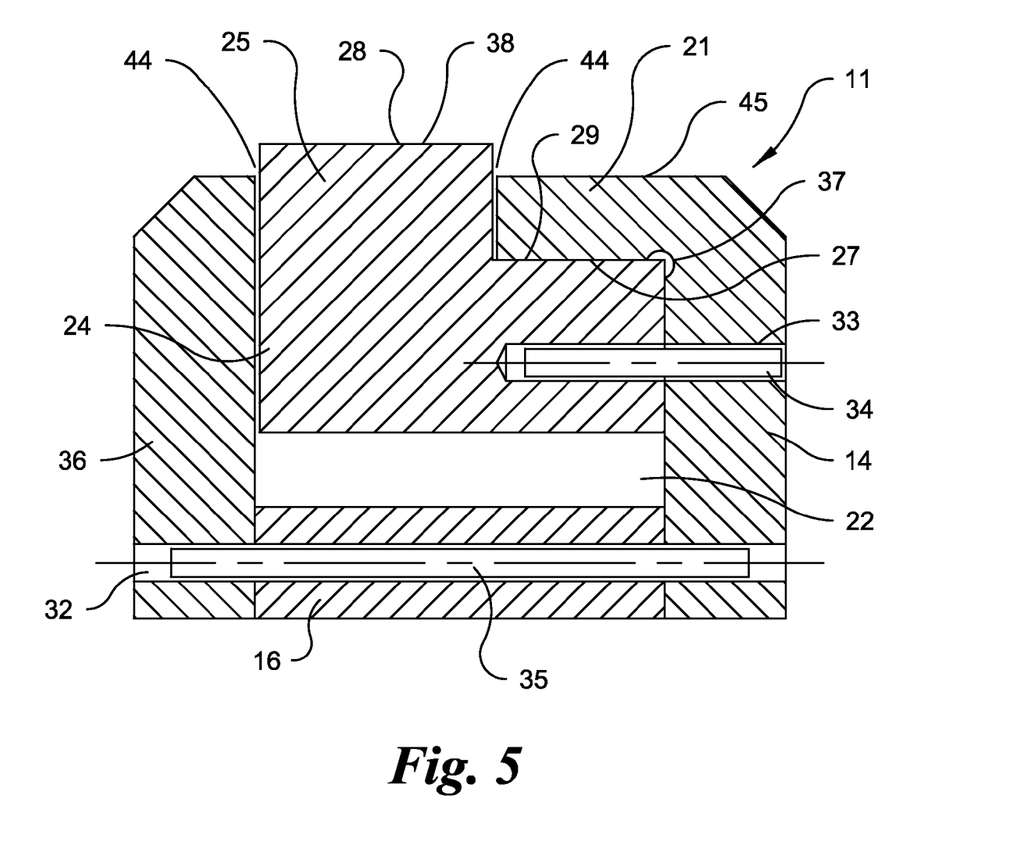
FIG. 5 is an enlarged cross sectional view illustrating a seal assembly with a generally L-shaped seal element in accordance with an embodiment of the invention.

In other embodiments, the ring flange 25 is positioned at one end of the ring 24 to form a substantially L-shaped cross section, as represented in FIG. 5. The stepwise cross section of the L-shaped seal element 38 provides a single first outer surface 27, along the interface between the outer diameter of the ring 24 and inner diameter of the ring flange 25, and a single second outer surface 28, along the outer diameter of the ring flange 25.

In preferred embodiments, ring 24 and ring flange 25 are manufactured via methods understood in the art from a single or monolithic structure. However, it is possible for the ring 24 and ring flange 25 to be separately manufactured and assembled via methods understood in the art to form the seal element 12.

In some embodiments, the seal element 12 or 38 could include at least one joint 41 which partially or completely transverses the cross section of the element, the latter arrangement allowing the seal element 12, 38 to open outward as centrifugal forces push the seal element 12, 38 against one or both flanges 18, 21. In other embodiments, the seal element 12, 38 could include two or more such joints 41 facilitating a segmented rather than continuous seal element 12, 38.

Figure 8A:
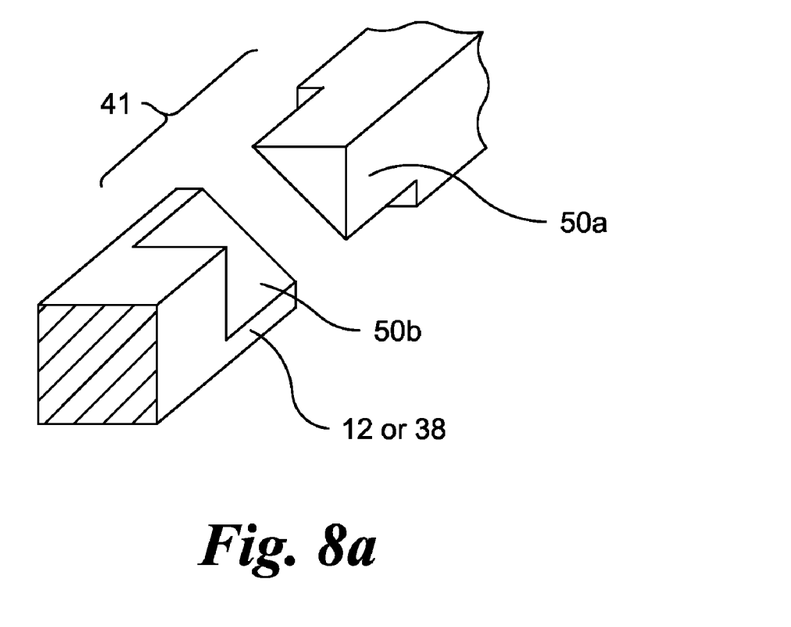
FIG. 8a is an enlarged perspective view illustrating a step joint formed by interlocking wedge-shaped steps in accordance with an embodiment of the invention.
Figure 8B:
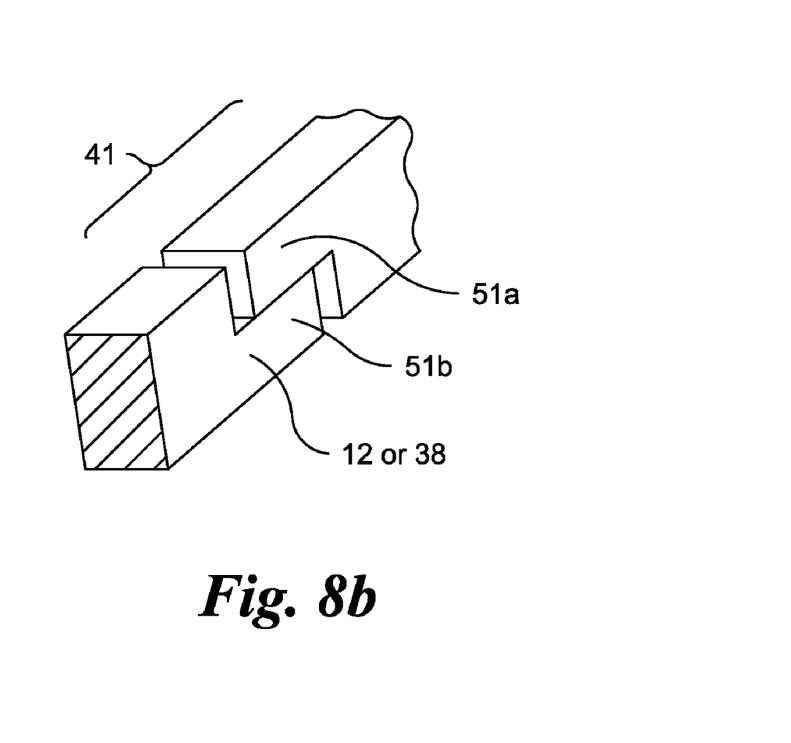
FIG. 8b is an enlarged perspective view illustrating a step joint formed by interlocking rectangular-shaped steps in accordance with an embodiment of the invention.

Joints 41 could include a variety of structures understood in the art. For example, FIG. 3 shows a straight cut joint. In another example, FIG. 8a shows a tongue and groove joint 41 including a pair of wedge-shaped steps 50a, 50b which interlock to minimize leakage across the joint 41. In yet another example, FIG. 8b shows a tongue and groove joint 41 including a pair of rectangular-shaped steps 51a, 51b which also interlock to minimize leakage across the joint 41. Steps 50a, 50b or 51a, 51b are disposed along the seal element 12 or 38 and could traverse the ring 24 and/or the ring flange 25 structures described herein.

Referring now to FIG. 4, the seal assembly 11 is shown for a seal element 12 with a generally inverted T-shaped cross section. The seal element 12 is disposed between the end rings 13, 14 so that the ring 24 is bounded by the end rings 13, 14. The ring flange 25 is disposed between the flanges 18, 21 so as to at least extend in a radial fashion beyond the upper surfaces 46, 45 of both flanges 18, 21, respectively.

In some embodiments, it is preferred to include a gap 44, disposed between one or both flanges 18, 21 and the vertical walls of the ring flange 25, to ensure that the seal element 12 floats inside the seal assembly 11 and has sufficient radial motion to properly adjust with thermal effects. In other embodiments, a gap 44 could be disposed between adjacent vertical walls along the ring 24 and one end ring 13. In yet other embodiments, a gap 31 could be disposed between lower surface 30 along one flange 18 and the first outer surface 27 along the ring 24. In still other embodiments, at least one first outer surface 27 should contact the lower surface 29 along the flange 21, because of manufacturing tolerance variations along the outer surfaces 27 of the ring 24 and lower surfaces 29 of the flanges 18, 21. In preferred embodiments, no gap 31 is present when components are precision machined so that the upper surfaces 29, 30 of the end rings 13, 14 and first outer surface 27 of the ring 24 are dimensionally identical.

In some embodiments, a spacer ring 16 is provided between the end rings 13, 14 so as to contact the outer surface of the inner shaft 19. One or more cavities 32 could traverse the spacer ring 16 about its circumference and one or both end rings 13, 14. Roll pins 35 and cavities 32 are complementary shaped so as to allow a roll pin 35 to be inserted into each cavity 32. Each cavity 32 along the end rings 13, 14 could be dimensioned to form an interference fit with a roll pin 35, while the cavity 32 through the spacer ring 16 could provide an interference or clearance fit. The roll pins 35 secure the seal element 12, end rings 13, 14, and spacer ring 16 so as to form a cartridge-like assembly.

In other embodiments, the spacer ring 16 could be spaced apart from the seal element 12 via a gap 17 of circular extent. The gap 17 should have sufficient radial height to accommodate the relative radial motion of the seal element 12 about the cavity 33 because of the clearance fit of the anti-rotation pin 34.

In preferred embodiments, there is no relative movement between the seal element 12 and other components comprising the seal assembly 11. One or more cavities 33 could completely or partially traverse the seal element 12 about its circumference and one or both end rings 13, 14. Anti-rotation pins 34 and cavities 33 are shaped so as to allow an anti-rotation pin 34 to be inserted into each cavity 33.

Each anti-rotation pin 34 could be press fitted onto the end ring 14 by providing an interference fit between the anti-rotation pin 34 and cavity 33 along the thickness of the end ring 14. However, the cavity 33 portion through the seal element 12 should be larger than the diameter of the anti-rotation pin 34 so as to allow the seal element 12 to slide or move axially and radially in response to mechanical and thermal effects to avoid binding along the seal element 12. For example, the cavity 33 portion through the seal element 12 could be either circular or slot-shaped. If movement of the seal element 12 is overly restricted due to inadequate clearance between the diameter of the cavity 33 along the seal element 12 and the diameter of anti-rotation pin 34 therein, the first outer surface 27 along the seal element 12 will not follow and seat onto the lower surface 29 of the flange 21. The result could be an unsteady condition without uniform radial support along the seal element 12 by the flanges 18, 21, potentially causing the seal element 12 to crack or explode. Other anti-rotation elements and approaches known within the art are applicable.

Each end ring 13, 14 is preferred to include a relief 37 disposed in a circumferential arrangement at the intersection of the horizontal flange 18, 21 with the vertical structure of each end ring 13, 14, so as to avoid stress concentrations within the end rings 13, 14 and fit and wear problems with the seal element 12. The relief 37 could be a radius, if space constraints preclude a relief 37. For example, a chamfer could be included at the interfaces of the first outer surface 27 and the vertical face of the ring 24.

Figure 9A:
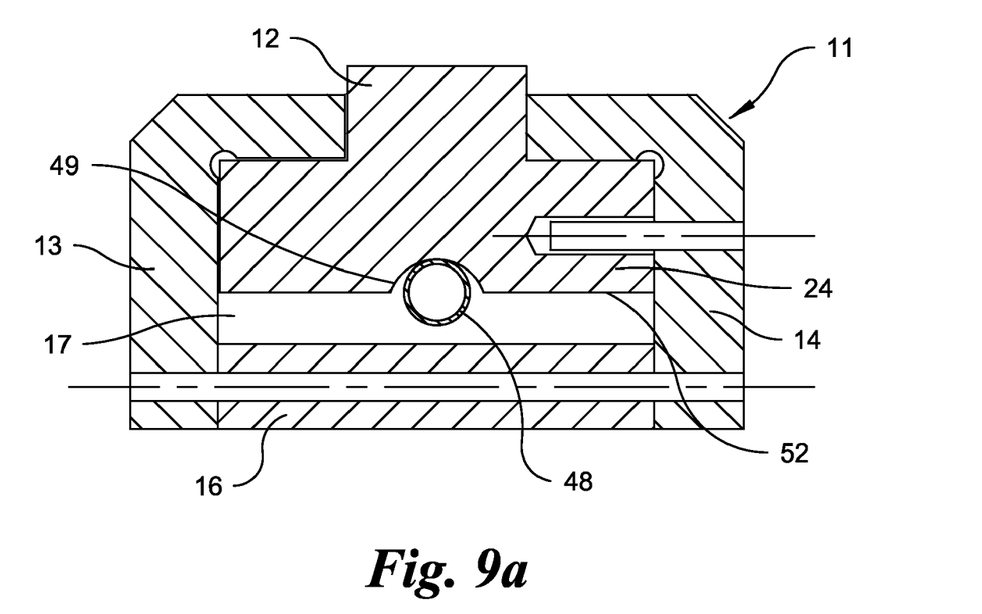
FIG. 9a is an enlarged cross sectional view illustrating a T-shaped seal element having a spring disposed along the inner diameter thereof in accordance with an embodiment of the invention.
Figure 9B:
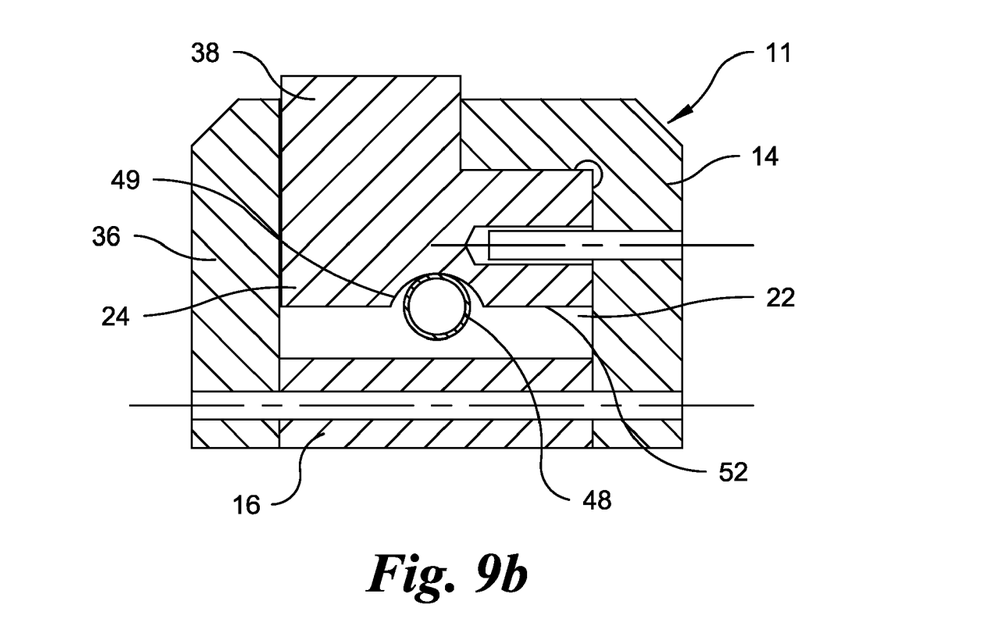
FIG. 9b is an enlarged cross sectional view illustrating an L-shaped seal element having a spring disposed along the inner diameter thereof in accordance with an embodiment of the invention.

Referring again to FIGS. 2-4, the left hand side of the seal assembly 11 is the high pressure side. When pressure is introduced, the seal element 12 seats onto the low pressure side of the end ring 14. The joint 41 includes a space which is compressed when the seal element 12 is assembled to form a seal assembly 11. Also, the first outer surface 27 seats and seals onto the lower surface 29. If the tension along the seal element 12 is inadequate to radially seat the first outer surface 27 against lower surface 29, an expander spring 48 could be used along the inner diameter of the seal element 12, as shown in FIGS. 9a and 9b. During operation of the inner and outer shafts 19, 20, centrifugal force seats the seal element 12 as the inner shaft 19 rotates; however, the tension described herein is required along the seal element 12 in order to properly seat the seal element 12 when the inner shaft 19 is stationary.

By selecting materials with coefficient of thermal expansion rates which are sufficiently similar, it is possible for the end rings 13, 14, spacer ring 16, inner shaft 19, and outer shaft 20 to expand and contract at similar rates. When the lower surface 29 expands, the first outer surface 27 follows the lower surface 29 because of the centrifugal force produced by the rotating inner shaft 19. The joint 41 opens to accommodate diametrical changes along the lower surface 29 caused by thermal effects, thus closely maintaining the clearance 40 shown in FIG. 2 between the outer diameter of the seal element 12 and inner diameter of the outer shaft 20.

Referring again to FIGS. 2, 4 and 5, the gap 17, 22 should be sufficiently large to accommodate thermally-induced expansion variations along the inner diameter of the seal element 12, 38; whereas, the gap 54 in FIG. 1a accommodates movement of the seal element 2 when inner and outer shafts 9, 10 are eccentrically aligned. The segment of the cavity 33 within the seal element 12, 38 is sized to likewise accommodate thermally-induced expansion variations along the seal element 12, 38. Accordingly, the size and shape of the cavity 33 within the seal element 12, 38 could differ from the portion of the cavity 33 disposed along the end ring 14. Furthermore, the clearance 40 in FIG. 2 is well defined, since the outer shaft 20 should not contact the seal element 12, 38. The end rings 13, 14 restrict radial movement of the seal element 12 and 38, thus avoiding the radial excursions possible by the seals described in FIGS. 1a and 1b.

Referring now to FIG. 5, the seal assembly 11 from FIG. 4 is shown having a seal element 38 with a generally L-shaped cross section composed of a ring 24 and ring flange 25. The seal element 38 is disposed between a generally planar-shaped end ring 36 and an L-shaped end ring 14 so that the ring 24 is bounded by both end rings 14, 36. The ring flange 25 is disposed between the end ring 36 and a flange 21 extending from the second end ring 14 so as to at least extend in a radial fashion beyond the upper surface 45 of the flange 21.

In some embodiments, it is preferred to include a gap 44, disposed between the vertical sides of flange 21 and/or the end ring 36 and the vertical walls of the ring flange 25, to ensure that the seal element 38 floats inside the seal assembly 11 and has sufficient radial motion to properly adjust to thermal effects. The first outer surface 27 should contact the lower surface 29 along the flange 21.

In other embodiments, a spacer ring 16 is provided between the end rings 14, 36 so as to contact the outer surface of the inner shaft 19. One or more cavities 32 could traverse the spacer ring 16 about its circumference and one or both end rings 14, 36. Roll pins 35 and cavities 32 are complementary shaped so as to allow a roll pin 35 to be inserted into each cavity 32. The roll pins 35 secure the seal element 38, end rings 14, 36, and spacer ring 16 so as to form a cartridge-like assembly, providing a structure which is readily shippable and handle-able. Each cavity 32 along the end rings 14, 36 could provide an interference fit with the roll pin 35, while the cavity 32 along the spacer ring 16 could provide either an interference or clearance fit.

In yet other embodiments, the spacer ring 16 could be separated from the seal element 38 via a gap 22 of circular extent. The gap 22 should have sufficient radial height to accommodate the relative radial motion of the seal element 38 about the cavity 33 because of the clearance fit of the anti-rotation pin 34.

In preferred embodiments, there is no relative movement between the seal element 38 and other components comprising the seal assembly 11. One or more cavities 33 could completely or partially traverse the seal element 38 about its circumference and one or both end rings 14, 36. Anti-rotation pins 34 and cavities 33 are shaped so as to allow an anti-rotation pin 34 to be inserted into each cavity 33. However, other anti-rotation elements and approaches known within the art are likewise applicable to the embodiments described herein.

Each anti-rotation pin 34 should be press fitted onto the end ring 14 by providing an interference fit between anti-rotation pin 34 and cavity 33 along the thickness of the end ring 14. However, the cavity 33 portion along the seal element 38 should be larger than the diameter of the anti-rotation pin 34 so as to allow the seal element 38 to slide or move axially and radially in response to mechanical and thermal effects without binding the seal element 12. For example, the cavity 33 along the seal element 38 could be either circular or slot-shaped. If movement of the seal element 38 is overly restricted due to inadequate clearance between the diameter of the cavity 33 along the seal element 12 and the diameter of anti-rotation pin 34 therein, the first outer surface 27 along the seal element 38 would not follow and seat onto the lower surface 29 of the flange 21, as described herein.

The end ring 14 is preferred to include a relief 37 disposed in a circumferential arrangement at the intersection of the horizontal flange 21 with the vertical structure of the end ring 14, so as to avoid stress concentrations therein and fit and wear problems with the seal element 38. The relief 37 could include a radius depending on space constraints.

In some embodiments, it might be advantageous for seal and/or wear purposes to include a non-linear profile along the second outer surface 28 of the seal elements 12, 38 shown in FIGS. 4 and 5, respectively.

Figure 6:
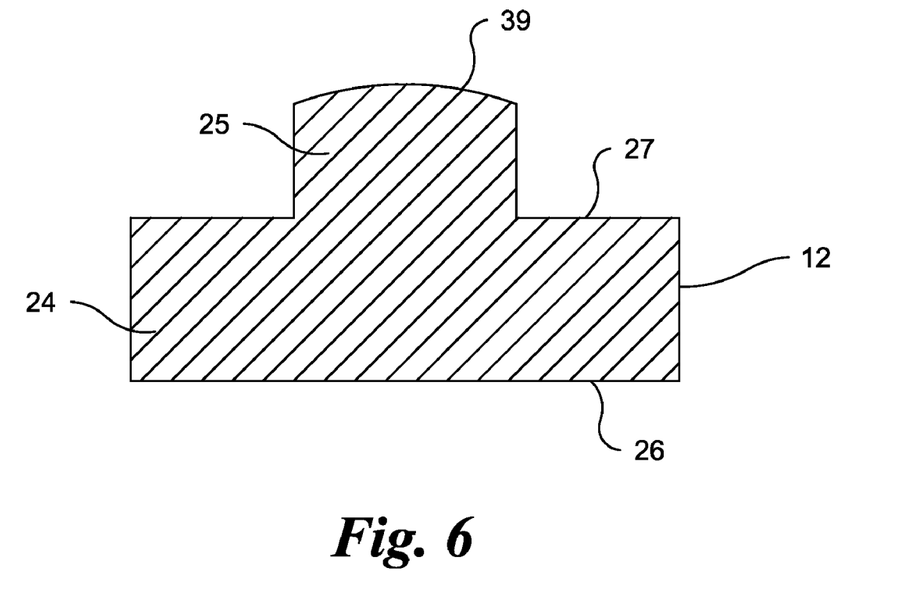
FIG. 6 is an enlarged cross sectional view illustrating an inverted and generally T-shaped seal element with contoured upper surface in accordance with an embodiment of the invention.

Referring now to FIG. 6, an inverted T-shaped seal element 12 is shown having a generally concave-shaped upper surface 39 along the ring flange 25. Remaining features of the ring 24, namely, first outer surface 27 and inner surface 26 are as described herein.

Figure 7:
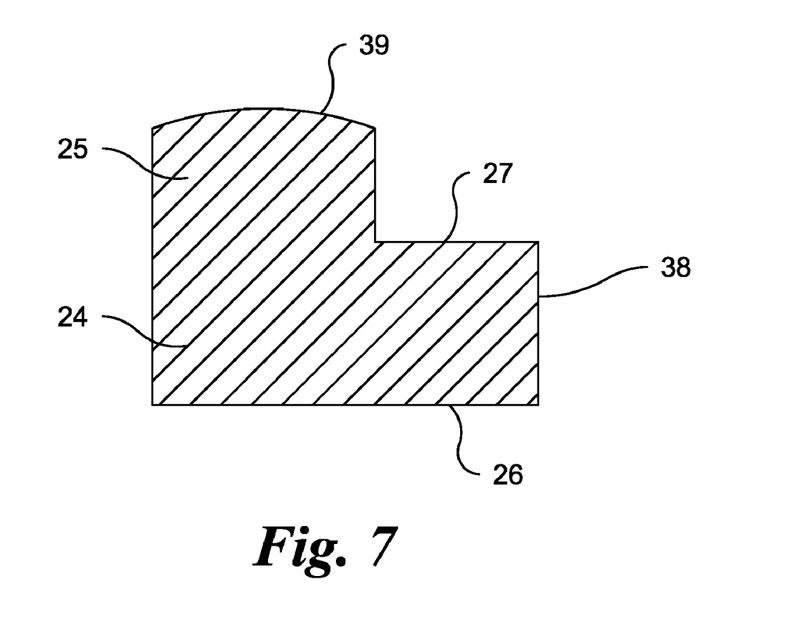
FIG. 7 is an enlarged cross sectional view illustrating a generally L-shaped seal element with contoured upper surface in accordance with an embodiment of the invention.

Referring now to FIG. 7, an L-shaped seal element 38 is shown having a generally concave-shaped upper surface 39 along the ring flange 25. Remaining features of the ring 24, namely, first outer surface 27 and inner surface 26 are as described herein.

Other contoured geometries composed of one or more concave, convex, and/or linear segments are likewise possible along the upper surface 39. The upper surface 39 could be molded onto or machined or shaped into an otherwise linear profile along the outermost diametrical surface of a seal element 12, 38.

In other embodiments, it might be advantageous for seal and/or wear purposes to include a spring 48 along the seal elements 12 and 38 shown in FIGS. 4 and 5, respectively. For example, FIGS. 9a and 9b show a spring 48 disposed along a groove 49 about the inner diameter 52 of the inverted T-shaped seal element 12 and L-shaped seal element 38, respectively. The spring 48 could be a garter spring, expander spring, or the like. The groove 49 is a semi-circular structure disposed along the seal element 12, 38 which approximates the curvature of the spring 48. The spring 48 imparts a radial force to seat the outer surface 27 of the seal element 12, 38 onto the lower surfaces 29 and/or 30 as the inner shaft 19 rotates. In other embodiments, the spring 48 could exert an outward radial force onto the seal element 12, 38 when the seal element 12, 38 is stationary.

Figure 10:
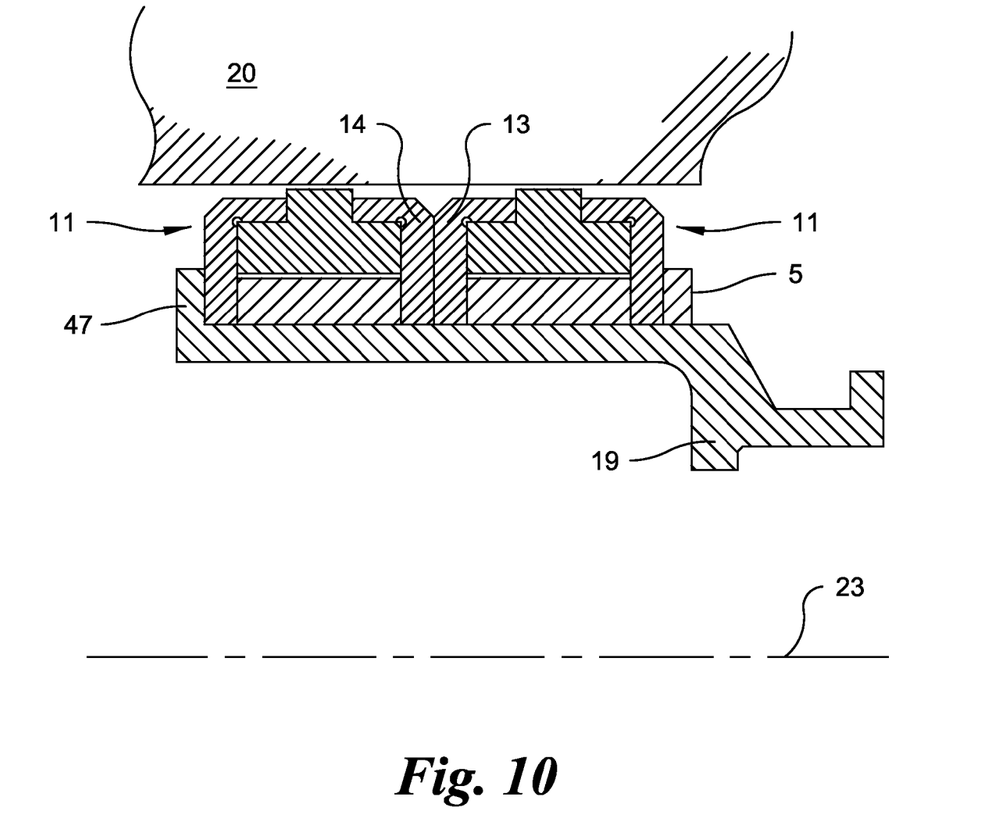
FIG. 10 is a cross sectional view illustrating a serial arrangement of seal assemblies disposed between an inner shaft and an outer shaft in accordance with an embodiment of the invention.
Figure 11:
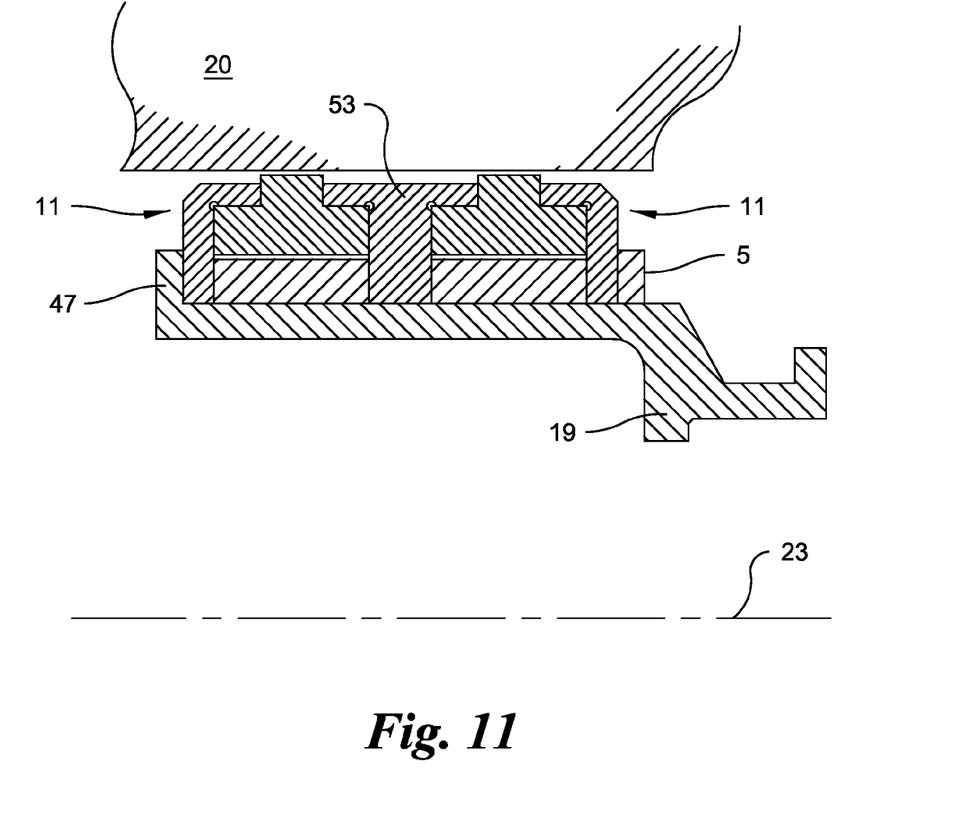
FIG. 11 is a cross sectional view illustrating a serial arrangement of seal assemblies with a shared intermediate ring disposed between an inner shaft and an outer shaft in accordance with an embodiment of the invention.

Referring now to FIGS. 10 and 11, it might be advantageous to arrange two or more seal assemblies 11, comprised of T-shaped seal elements 12 and/or L-shaped seal elements 38 described herein, in a stacked or serial fashion between an inner shaft 19 and an outer shaft 20. Seal assemblies 11 could be secured to the inner shaft 19 between a mechanical stop 47 and a locking ring 5, however other arrangements are possible. The total number of seal assemblies 11 is dependent on the space constraints along the inner shaft 19. In FIG. 10, the seal assemblies 11 are constructed as described herein. In FIG. 11, the innermost end rings 14, 13 identified in FIG. 10 are replaced by a single intermediate ring 53 having a generally T-shaped cross section. Both multi-seal assemblies reduce the total flow of air across the seal system.

The seal elements 12, 38 described herein could be composed of high-temperature, carbon-graphite compositions known within the art. An advantage of carbon-graphite is its ability to wear without damage, unlike metals, when the relative movement between the inner and outer shafts 19, 20 exceeds the clearance 40 represented in FIG. 2. However, the invention described herein also allows for the use of high-temperature metal and metal alloys because the seal assembly 11 avoids the wear problems associated with dual-shaft systems. Exemplary metal and metal alloys could include, but are not limited to, 17-4 PH, 410 SS, titanium, and Inconel-X® (the registered trademark of the Huntington Alloys Corporation of Huntington, West Va.). Metals further allow the matching of thermal expansion coefficients for materials composing the inner and outer shafts 19, 20, seal element 12 or 38, and end rings 13, 14 or 14, 36.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A seal assembly for use between an inner shaft and an outer shaft rotatable about a common axis within a turbine engine comprising:
   (a) a pair of end rings, at least one said end ring having a flange disposed along and extending from one side of said end ring, said flange having an upper surface and a lower surface; and
   (b) a seal element comprised of a ring and a ring flange, said ring wider than said ring flange, said ring having an inner radial surface and an outer radial surface, said ring flange disposed along and extending from said outer radial surface, said seal element has at least one joint, said outer radial surface directly contacting said lower surface along at least one said flange, said seal element disposed between said end rings so that a portion of said ring flange extends beyond said flange, at least one said end ring completely separated from said seal element along an axis parallel to said inner shaft by at least one gap extending radially outward from said inner shaft.

2. The seal assembly of claim 1, wherein said seal element has an inverted and substantially "T"-shaped cross section.

3. The seal assembly of claim 1, wherein said seal element has a substantially "L"-shaped cross section.

4. The seal assembly of claim 1, wherein at least one end ring has an inverted and substantially "L"-shaped cross section.

5. The seal assembly of claim 1, wherein a gap is disposed between said lower surface of one said end ring and said outer radial surface of said seal element.

6. The seal assembly of claim 1, wherein said seal element does not contact said outer shaft.

7. The seal assembly of claim 1, wherein said ring flange has a convex shaped surface adjacent to said outer shaft.

8. The seal assembly of claim 1, wherein said seal element and only one said end ring experience relative movement along said axis parallel to said inner shaft.

9. The seal assembly of claim 1, further comprising:
   (c) a gap bounded along a left side and a right side by said end rings, along an outer side by said seal element, and along an inner side by said inner shaft.

10. The seal assembly of claim 9, further comprising:
    (d) a spacer ring disposed between said gap and said inner shaft.

11. The seal assembly of claim 10, wherein said spacer ring is secured mechanically to at least one said end ring.

12. The seal assembly of claim 10, further comprising:
    (e) a locking nut directly contacting one said end ring to secure said seal assembly to said inner shaft.

13. The seal assembly of claim 1, wherein said seal element is movable axially between said end rings parallel to said inner shaft.

14. The seal assembly of claim 1, further comprising:
    (c) a locking nut directly contacting one said end ring to secure said seal assembly to said inner shaft.

15. The seal assembly of claim 1, wherein said seal element is composed of a metal or a metal alloy, said seal element, said end rings, said inner shaft, and said outer shaft having substantially similar thermal expansion properties to avoid contact between said seal element and said outer shaft.

16. The seal assembly of claim 1, wherein said seal element has at least one joint traversing its cross section.

17. The seal assembly of claim 1, wherein one said end ring is an integral part of said inner shaft.

18. The seal assembly of claim 1, further comprising:
    (c) a spring disposed within a groove along said seal element, said spring imparting an outward radial force onto said seal element.

19. A seal assembly disposed within a turbine engine comprising:
    (a) an inner shaft;
    (b) an outer shaft, said inner shaft and said outer shaft rotatable about a common axis; and
    (c) at least one seal unit disposed between said inner shaft and said outer shaft, each said seal unit including:
       (i) a pair of end rings disposed along and directly contacting said inner shaft, at least one said end ring having a flange disposed along and extending from one side of said end ring, said flange having an upper surface and a lower surface; and
       (ii) a seal element comprised of a ring and a ring flange, said ring wider than said ring flange, said ring having an inner radial surface and an outer radial surface, said ring flange disposed along and extending from said outer radial surface, said seal element has at least one joint, said outer radial surface directly contacting said lower surface along at least one said flange, said seal element disposed between said end rings so that a portion of said ring flange extends beyond said flange without contacting said outer shaft, at least one said end ring completely separated from said seal element along an axis parallel to said inner shaft by at least one gap extending radially outward from said inner shaft.

20. The seal assembly of claim 19, wherein said ring flange has a convex shaped surface adjacent to said outer shaft.

21. The seal assembly of claim 19, wherein said at least one seal unit further comprises:
    (iii) a spacer ring disposed between said end rings and directly contacting said inner shaft; and
    (iv) a gap disposed between said seal element and said spacer ring.

22. The seal assembly of claim 21, wherein said spacer ring is mechanically secured to at least one said end ring.

23. The seal assembly of claim 21, further comprising:
    (d) a locking nut directly contacting one said end ring to secure said at least one seal unit to said inner shaft.

24. The seal assembly of claim 21, wherein said seal element is movable axially between said end rings parallel to said inner shaft.

25. The seal assembly of claim 19, further comprising:
(d) a locking nut directly contacting one said end ring to secure said at least one seal unit to said inner shaft.

26. The seal assembly of claim 19, wherein said seal element is composed of a or a metal alloy, said end rings, said inner shaft, and said outer shaft have substantially similar thermal expansion properties to avoid contact between each said seal element and said outer shaft.

27. The seal assembly of claim 19, wherein one said end ring is an integral part of said inner shaft.

28. The seal assembly of claim 19, wherein said at least one seal unit further comprises:
(iii) a spring disposed within a groove along said seal element, said spring imparting an outward radial force onto said seal element.

29. The seal assembly of claim 19, wherein said end ring disposed between two said seal elements is a single structure.

* * * * *